Patented June 28, 1932

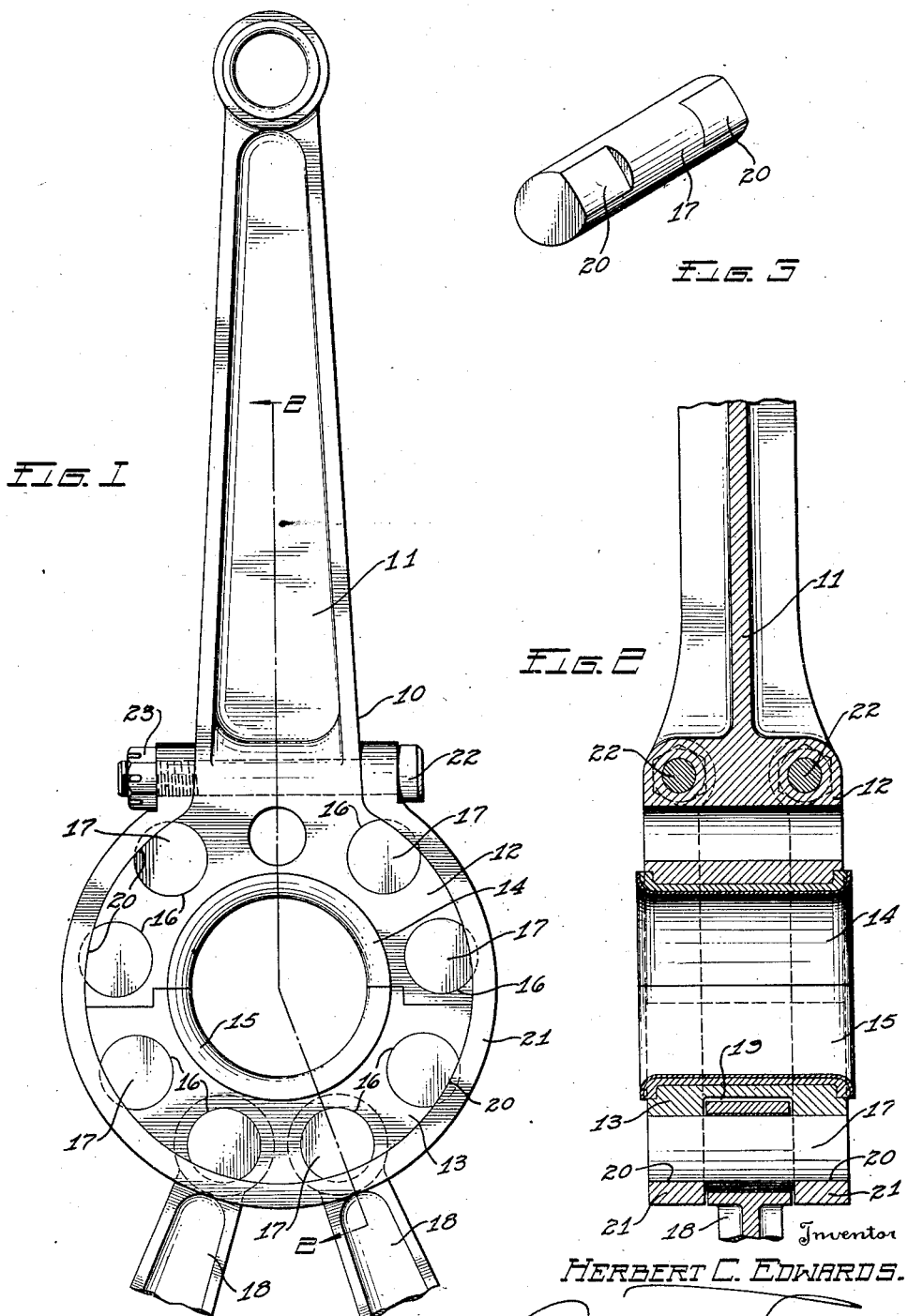

1,865,092

UNITED STATES PATENT OFFICE

HERBERT C. EDWARDS, OF DETROIT, MICHIGAN, ASSIGNOR TO PACKARD MOTOR CAR COMPANY, OF DETROIT, MICHIGAN, A CORPORATION OF MICHIGAN

INTERNAL COMBUSTION ENGINE

Application filed July 21, 1930. Serial No. 469,477.

This invention relates to internal combustion engines and more particularly to connecting rod assemblies.

In engines of radial or similar types it is customary to provide a connecting rod assembly which consists of a master rod having a hub, formed of either one or two pieces, and a plurality of connecting rods pivotally connected to the hub. With a single or two-part crank shaft, either a one or two piece master rod hub can be utilized, but with an integral throw crank shaft structure a two-part master rod hub is required as the hub cannot be assembled endwise on the throw pin.

This invention has to do more particularly with connecting rod assemblies for association with integral throw crank shafts, however it can be utilized equally as well with crank shafts having throws formed in sections.

An object of the invention is to provide a light-weight connecting rod assembly for engines.

Another object of the invention is to provide a connecting rod assembly for radial engines which can be quickly attached to and removed from the throw of a crank shaft.

A further object of the invention is to provide a connecting rod assembly for internal combustion radial engines in which a pair of retaining members serve the dual function of securing a two-part master hub together and retaining a plurality of connecting rod pins in desired relation with the master rod hub.

Still another object of the invention is to provide a rod assembly in which a pair of retaining members are formed and arranged to secure a plurality of pins in position with a master rod hub.

Other objects of the invention will appear from the following description taken in connection with the drawing, which form a part of this specification, and in which:

Fig. 1 is an end elevational view of a connecting rod assembly incorporating the invention;

Fig. 2 is a sectional view of the assembly taken on line 2—2 of Fig. 1;

Fig. 3 is a perspective view of one of the connecting rod pins.

Referring to the drawing by characters of reference, 10 indicates generally the master rod and hub of a connecting rod assembly for a radial internal combustion engine. The master rod 11 and a hub section 12 are preferably formed integrally, while a hub section 13 is formed separately and is adapted to be associated with the section 12 to provide a complete hub. Bearing sections 14 and 15, of a conventional design, are associated with the hub sections 12 and 13, respectively, and are adapted to encircle the throw of a crank shaft (not shown). The hub of the master rod is shown formed in two sections so that it can be assembled with and removed from an integrally formed crank shaft throw.

Substantially equally spaced opening 16 extend in an axial direction through the hub, such openings preferably intersecting the hub periphery and being arranged in a circular relation. Cylindrical connecting rod pins 17 extend through the openings and the connecting rod ends 18, the hub sections being formed with recesses 19 for the reception of the ends of the connecting rods. The ends of the pins are formed with a flatted surface 20, such surfaces being of a nature to form a continuation of the hub periphery when in final assembly position.

Tightly encircling the ends of the hub sections and engaging the flatted end portions of the connecting rod pins, I provide a pair of collar members 21 preferably in the form of metal bands which can be slightly contracted or expanded. The ends of the bands extend parallel with the base portion of the master rod and are detachably secured thereto by the bolts 22 and nuts 23. The adjustment of the nuts on the bands regulates the degree of compression exerted by the bands around the hub and the pins.

It will be seen that the collars secure the hub section 13 with the hub section 12, and also fix the connecting rod pins with the hub so that they cannot rotate in the opening or move axially. The collars, serving to secure both the pins and the hub sections, tend to the production of a lighter weight assembly than when bolts are used to secure the hub sections together and individual securing means are provided to fix the connecting rod pins with the hub. The collars, furthermore, provide a simple securing means which can be quickly assembled or removed to allow the connecting rod assembly to be positioned with or removed from the crank shaft or to promote assembly or disassembly of the elements comprising the structure.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

What I claim is:

1. In a multiple connecting rod assembly, a master rod having an integrally formed hub section at one end, another separate hub section adapted to be associated with the integral hub section, collar members surrounding the ends of the associated hub sections, and detachable securing means extending through the collar ends and the master rod.

2. In a multiple connecting rod assembly, a master rod having an integrally formed hub section at one end, another separate hub section adapted to be associated with the integral hub section, a pair of single piece collar members surrounding the ends of the associated hub sections, and detachable securing means extending through the ends of the collar members and the master rod.

3. In a multiple connecting rod assembly, a master rod, a hub having pin openings extending in an axial direction therethrough, said openings being circularly disposed and intersecting the periphery of the hub, connecting rod pins in the hub openings having flatted ends arranged to face the hub periphery, a pair of collars encircling the hubs and engaging the flatted pin ends, and detachable means securing the ends of the collars to the rod.

4. In a multiple connecting rod assembly, a master rod, a hub having pin openings intersecting the periphery and extending axially therethrough, said pins having flatted ends in the plane of the hub perimeter, and a pair of collars secured at their ends to the rod, said collars closely encircling the hub periphery and the flatted ends of the pins.

5. In a multiple connecting rod assembly, a master rod having a hub section formed integral therewith, another hub section adapted to be associated with the integral hub section, said hub sections having a plurality of circularly arranged openings extending in an axial direction therethrough, connecting rod pins in the openings, a pair of collars surrounding the ends of the hub sections and the ends of the pins, said collars being associated with the pins to prevent their movement in the openings, and means securing the ends of the collars to the master rod.

6. In a multiple connecting rod assembly, a master rod having a hub section formed integrally therewith, another hub section adapted to be associated with the integral hub section, said hub sections having a plurality of circularly disposed openings extending in an axial direction therethrough and intersecting the periphery thereof, connecting rod pins in the openings, said pins having flatted ends conforming to the outline of the hub sections, a pair of collar members tightly embracing the ends of the hub sections and the flatted portions of the pins, and detachable means securing the ends of the collar members to the master rod.

In testimony whereof I affix my signature.

HERBERT C. EDWARDS.